Oct. 20, 1964  R. W. EICHLER ETAL  3,153,534
PAPER SUPPLY TRAY

Original Filed July 2, 1959  9 Sheets-Sheet 1

INVENTOR.
ROLF W. EICHLER
ROGER H. EICHORN
JOHN RUTKUS, JR.
BY
ATTORNEY

Oct. 20, 1964   R. W. EICHLER ETAL   3,153,534
PAPER SUPPLY TRAY

Original Filed July 2, 1959   9 Sheets-Sheet 5

INVENTOR.
ROLF W. EICHLER
ROGER H. EICHORN
BY  JOHN RUTKUS, JR.

ATTORNEY

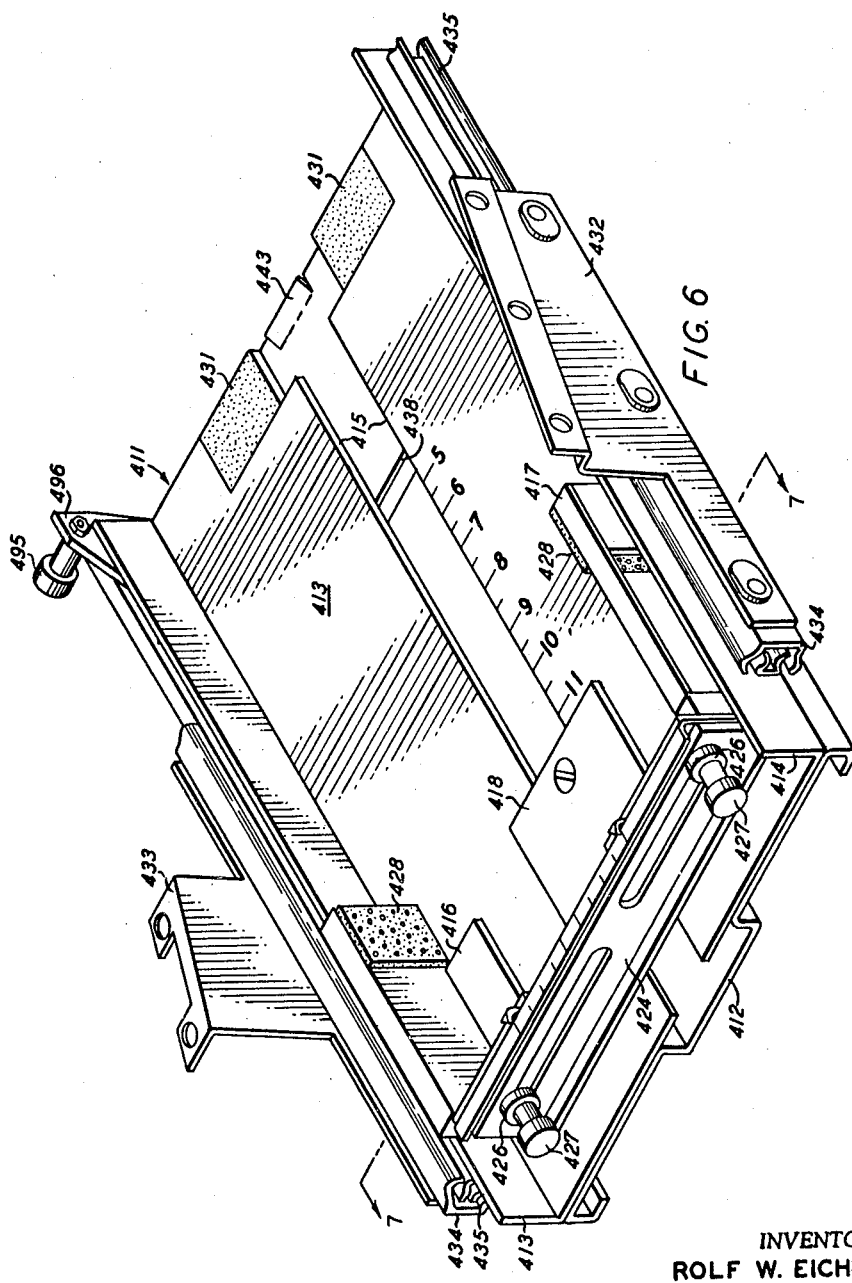

Oct. 20, 1964 R. W. EICHLER ETAL 3,153,534
PAPER SUPPLY TRAY
Original Filed July 2, 1959 9 Sheets—Sheet 7
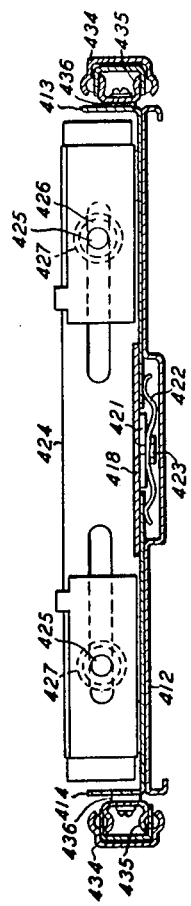
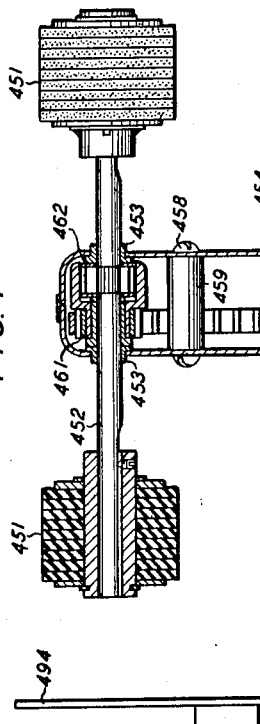
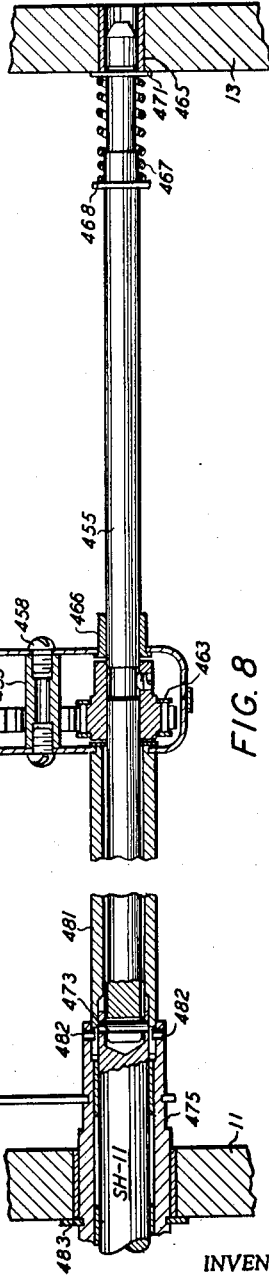
INVENTOR.
ROLF W. EICHLER
ROGER H. EICHORN
BY JOHN RUTKUS, JR.
ATTORNEY

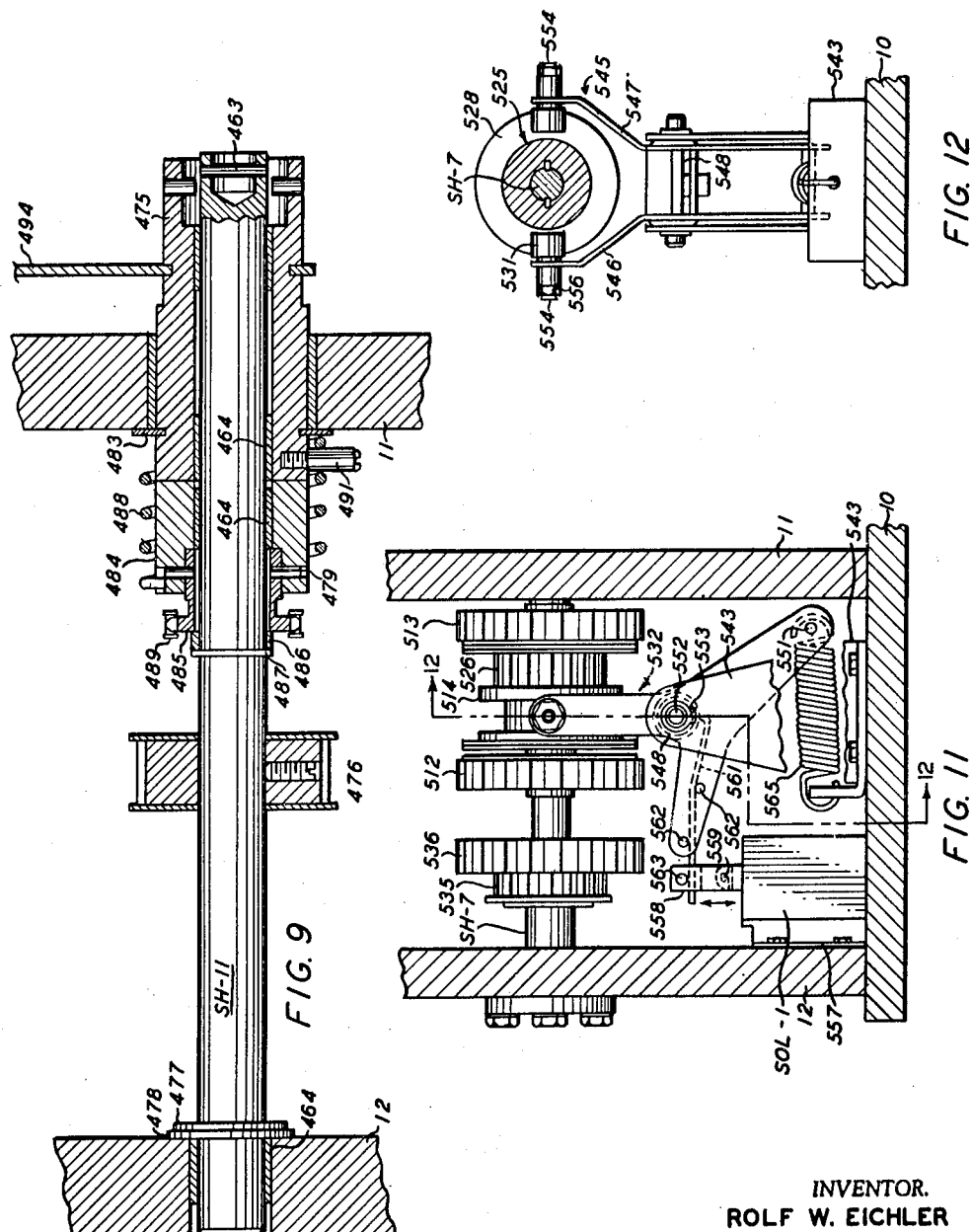

United States Patent Office 3,153,534
Patented Oct. 20, 1964

3,153,534
PAPER SUPPLY TRAY
Rolf W. Eichler, Fairport, Roger H. Eichorn, Webster, and John Rutkus, Jr., Penfield, N.Y., assignors to Xerox Corporation, a corporation of New York
Original application July 2, 1959, Ser. No. 824,659, now Patent No. 2,945,434, dated July 19, 1960. Divided and this application July 18, 1960, Ser. No. 43,436
2 Claims. (Cl. 271—61)

This invention relates in general to xerographic apparatus and, in particular, to a paper supply tray from which sheets of transfer material are fed seriatum to a xerographic drum. This application is a division of copending Eichler et al. application Serial No. 824,659, filed July 2, 1959, now Patent No. 2,945,434.

More specifically, the invention relates to an improved supply tray for sheets of transfer material, that is particularly adapted for use in xerographic reproducing machines and comparable types of devices wherein it is desired to feed sheets of paper or similar material in succession from a stack of paper.

Although edge supports and other means are well known for aligning the edges of a stack of paper and to aid in the separation of the top sheet from the stack so that only a single sheet is fed successively to the reproducing apparatus, many disadvantages are found in these devices. For example, great difficulty is encountered in the use of edge supports because it has been found that they do not grip the sides of a stack of paper evenly, especially after repeated use due to wear of the pressure edge supports or wear of the positioning mechanism for the edge supports. Another difficulty is that when the stack of paper is nearly exhausted there is a tendency for the separator roller to advance the entire remaining sheets instead of the topmost sheet only. It is therefore the principal object of this invention to improve paper feed trays for supporting various size sheets of paper in a stack to be fed in succession from the top of the stack.

Another object of this invention is to improve edge guides or supports for a stack of paper.

For a better understanding of the invention as well as other objects and further features thereof, reference is had to the following detailed description of the invention to be read in connection with the accompanying drawings, wherein:

FIG. 6 is a right-hand perspective view of the paper feed tray;

FIG. 7 is a sectional view of the paper feed tray taken along line 7—7 of FIG. 6;

FIG. 8 is a sectional view of the paper separator roller and associated elements;

FIG. 9 is a sectional view of the paper separator roller drive and tensioning elements;

FIG. 11 is a front view of the clutch mechanism of the paper feed system;

FIG. 12 is a sectional view taken along line 12—12 of FIG. 11.

Figure 1:
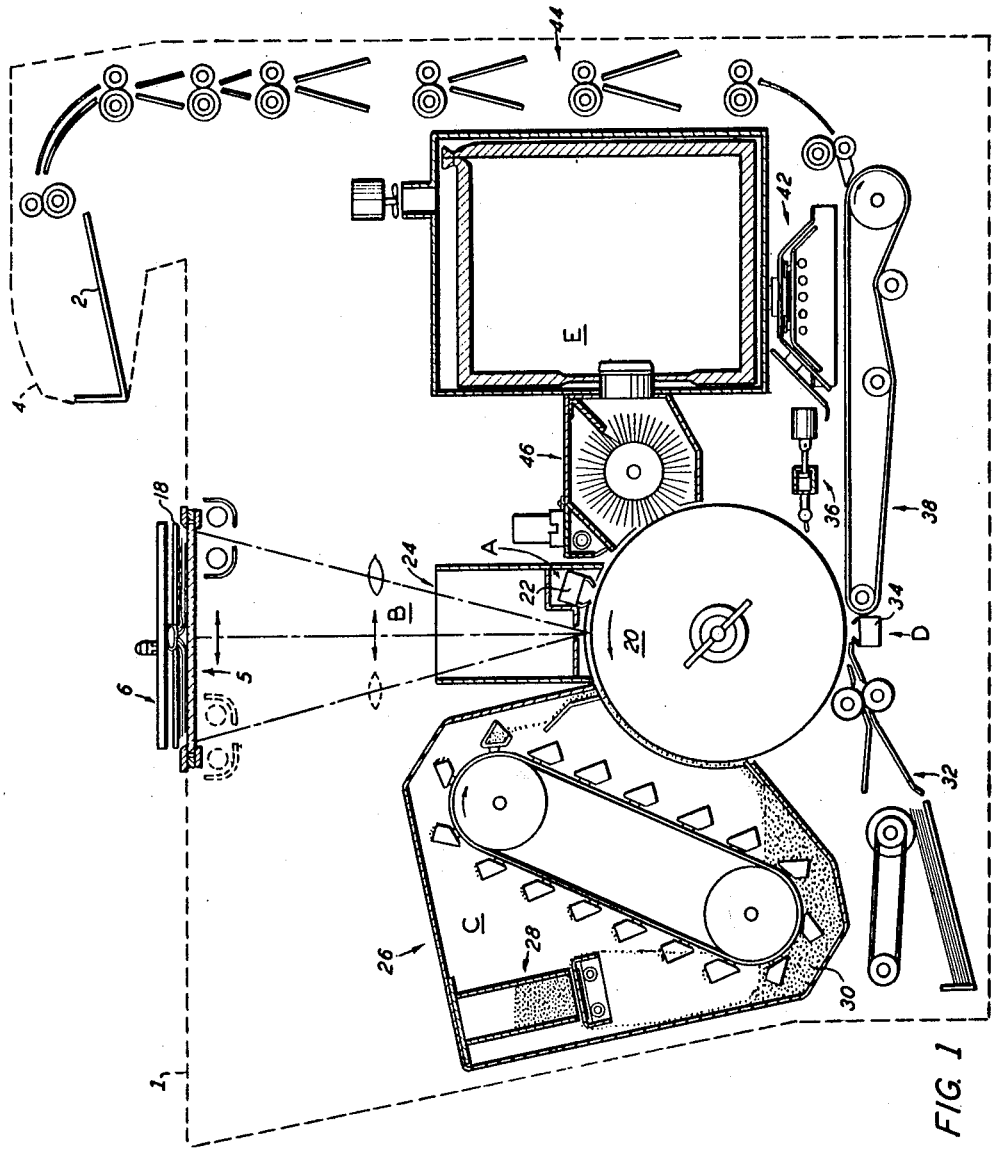
FIG. 1 illustrates schematically a preferred embodiment of a xerographic apparatus adapted for continuous and automatic operation and incorporating an optical scanning mechanism.
Figure 2:
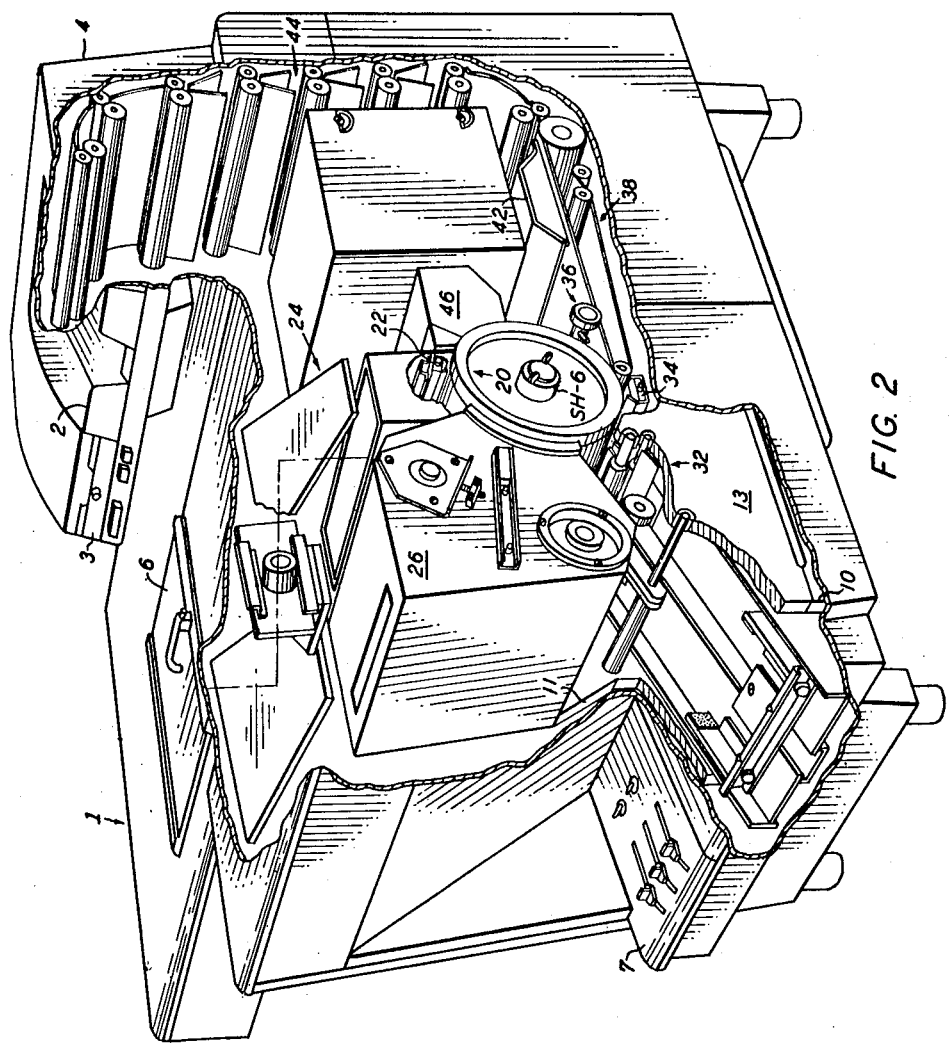
FIG. 2 is a right-hand perspective view of the xerographic apparatus of the invention with parts of the desk covering broken away to show the arrangement of the xerographic machine elements.
Figure 3:
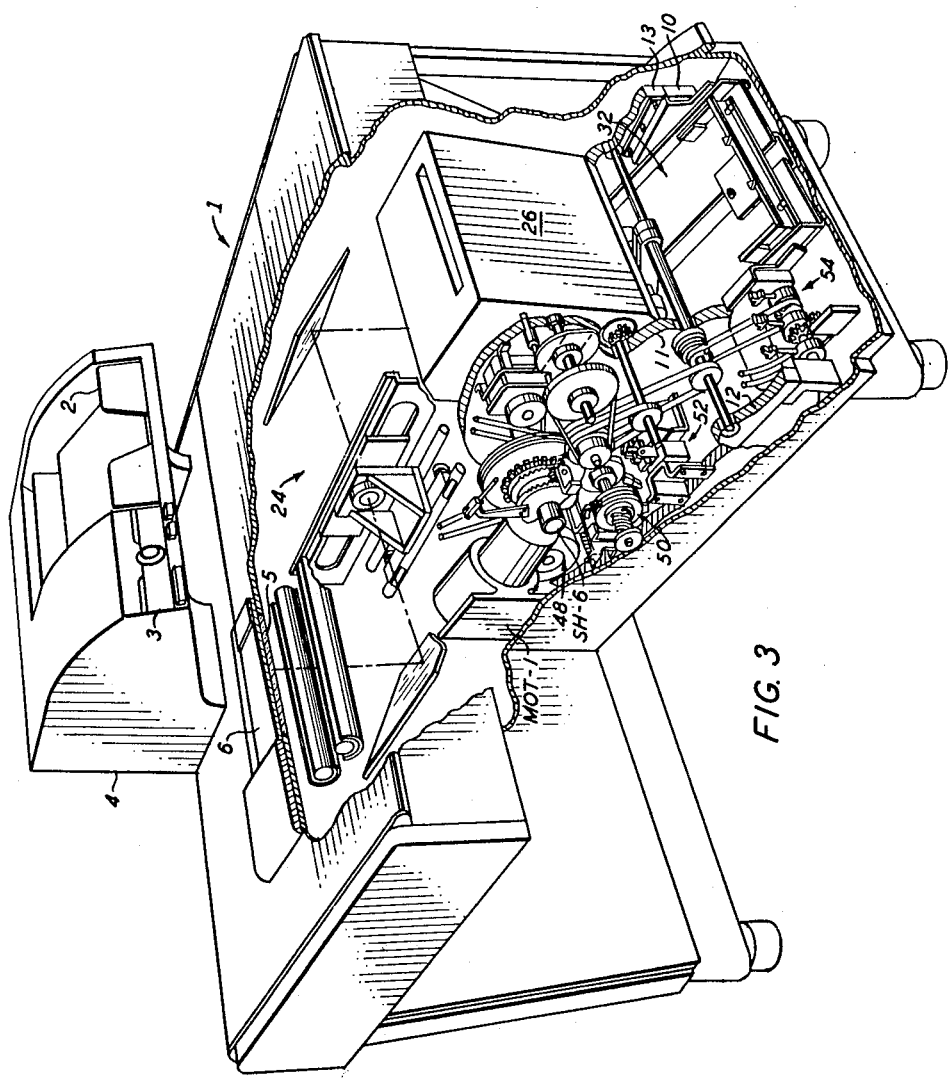
FIG. 3 is a left-hand perspective view of the xerographic apparatus with the parts of the desk covering broken away to show the arrangement of the xerographic machine elements.

Referring now to the drawings, there is shown in FIGS. 1, 2 and 3, a xerographic processing machine used for producing xerographic reproductions from a stationary original, the original being either transparent, translucent or opaque copy, whether in the form of single sheets, books, or in three-dimensional form. To conform to modern office decor the xerographic apparatus of the invention is adapted for installation in a suitable desk, constructed so that an operator seated at the desk may conveniently control all operations of the apparatus.

The desk, generally designated 1, constructed in a conventional manner, has mounted on the top and in the right-hand corner thereof a main control panel for initiating operation of the machine and for selecting and indicating the number of reproductions to be made, and a collecting tray 2 for finished reproductions, usually made on paper. Although the reproductions may be discharged from the copier-duplicator for collection at any point accessible externally of the machine, it is preferred that the discharge terminal of the reproduction or paper feed means be embodied in a super-structure 4 overhanging the rear portion of the desk top, said super-structure also housing the main control panel 3 of the apparatus. Thus the document holder or copyboard 5 and its covering platen 6 can be left unobstructed at the front part of the desk over the knee space.

In the lower right-hand corner of the desk is a second control panel 7 for additional control circuits and for levers to control the length of scan, to control the tensions of the paper separator rollers on a stack of paper to adjust for different paper weights, and for controlling the toner dispensing rate of the machine.

As shown schematically in FIG. 1, the xerographic apparatus comprises a xerographic plate including a photoconductive layer or light-receiving surface on a conductive backing and formed in the shape of a drum, generally designated by numeral 20, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 22 includes a corona discharge array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a stationary original. To permit substantially any type of original copy, including books, magazines and other types of cumbersome three-dimensional objects to be copied for the reproduction of specific information contained thereon, the optical projection system shown is of the type disclosed in copending Mayo application, Serial No. 783,388, filed December 29, 1958, now Patent No. 3,062,094.

The optical scanning or projection assembly, generally designated 24, comprises a stationary copyboard 5, which may consist of a transparent plate member such as, for example, a glass plate or the like positioned parallel to the top of the desk, which is adapted to support a master or original, such as book 18 placed face downward on its upper surface, the copyboard being uniformly illuminated and arranged in light-projecting relation to the moving light-receiving surface of the xerographic drum 20. Uniform lighting is provided by a pair of lamps attached to a slotted light reflector mounted for movement to traverse the plane of the copyboard.

A light shield adapted to protect the xerographic drum from extraneous light is positioned adjacent to the surface of the xerographic drum. A slot aperture in the light shield extends transversely to the path of movement of the light-receiving surface of the xerographic drum 20 to permit reflected rays from the copyboard to be directed against a limited transverse area of the light-receiving surface as it passes therebeneath. As shown, the light shield also encloses the corona charging device 22.

To enable the optical system to be enclosed within a conventional-size desk, a folded optical system including an object mirror, a lens, and an image mirror is used in the preferred embodiment of the invention.

The lens element positioned between the copyboard and the light shield is arranged for movement in a path to traverse the plane of the copyboard in timed relation to the movement of the light source, whereby the subject image of the original supported by the copyboard is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 26 including a casing or housing having a lower or sump portion for accumulating developing material 30. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 28 of the type disclosed in copending Hunt application, Serial No. 776,976, filed November 28, 1958, now Patent No. 3,013,703, is used to accurately meter toner to the developing material.

Positioned next and adjacent to the developing station is the image transfer station D which includes suitable sheet feeding mechanism adapted to feed sheets of paper successively to the xerographic drum in coordination with the presentation of the developed image on the drum at the transfer station. This sheet feeding mechanism, generally designated 32, includes a sheet source such as a tray for a plurality of sheets of a suitable transfer material that is, typically, sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 34 that is located at or immediately after the point of contact between the transfer material and the rotating drum. The corona transfer device 34 is substantially similar to the corona discharge device that is employed at charging station A in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xeropraghic powder image from the drum surface and cause them to adhere electrostatically to the surface of the transfer material.

Immediately subsequent to the image transfer station is positioned a transfer material stripping apparatus or paper pickoff mechanism, generally designated 36, for removing the transfer material from the drum surface. This device includes a plurality of small diameter, multiple outlet conduits of a manifold that is supplied with pressurized aeriform fluid by a pulsator operated by a suitable power means. The pulsator is adapted to force jets of pressurized aeriform fluid through the outlet conduits into contact with the surface of the drum slightly in advance of the sheet material to strip the leading edge of the sheet material from the drum surface and to direct it onto an endless conveyor 38 whereby the sheet material is carried to a fixing device, such as, for example, heat fuser 42, whereby the developed and transferred xerographic powder image on the sheet material is permanently fixed thereto.

After fusing, the finished copy is preferably discharged from the apparatus at a suitable point for collection externally of the apparatus. To accomplish this there is provided a vertical conveyor, generally designated 44, by means of which the copy is delivered to a copy holder positioned in a suitable super-structure overhanging the rear portion of the desk top.

The next and final station in the device is a drum cleaning station E, having positioned therein a drum cleaning device 46 adapted to remove any powder remaining on the xerographic drum after transfer by means of a rotating brush and whereby the xerographic drum is flooded with light to cause dissipation of any residual electrical charge remaining on the xerographic drum.

To remove residual powder from the xerographic drum there is disposed a cylindrical brush rotatively mounted on an axle. For collecting powder particles removed from the xerographic drum by the brush there is provided a dust hood that is formed to encompass approximately two-thirds of the brush area. To insure thorough cleaning of the brush a flicking bar is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct is arranged to cover a slot that extends transversely across the dust hood and is connected to a filter bag in the filter box. A motor-fan unit, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor-fan unit.

Any residual electrical charge remaining on the xerographic drum is dissipated by light from a fluorescent lamp mounted in a suitable lamp housing hinged to the dust hood, a starter being provided for energizing the fluorescent lamp.

Suitable drive means drive the drum, lens element, and slotted light reflector at predetermined speeds relative to each other and included are means to return the lens element and the slotted light reflector to their respective traverse starting positions and means to effect operation of the bucket-type conveyor, toner dispenser, endless conveyor, vertical conveyor; the separating roller and feed rollers being controlled in a manner to permit the feed of a sheet of transfer material into registered impression contact with the developed image on the xerographic drum as it is rotated through the transfer station. Stated in a different manner, a sheet of transfer material is advanced in time relation to the start of scan of the leading edge of a copy.

Referring now to FIGS. 2 and 3 there is shown the general arrangement of the xerographic apparatus within the desk 1. As shown, there is provided a frame for supporting the components of the apparatus formed by a base plate 10 to which are mounted full front and rear plates 11 and 12, respectively, and partial plate 13. The plates are connected together and maintained rigidly in spaced relation to each other by suitable tie plates, not shown.

As shown in FIG. 2, the xerographic drum 20 is mounted on horizontal driven shaft SH6 and the drum is positioned on the exposed front face of front plate 11, with the major xerographic components of the machine mounted around the drum either on the exposed front face of plate 11 or between plate 11 and partial plate 13.

The main drive elements and controls for the xerographic components are mounted between front and rear plates 11 and 12, respectively, as shown in FIG. 3, and they include as major components thereof, a main drive motor MOT1, a scan control mechanism 48 for operating the movable elements of the optical system 24, a programmer 50 for actuating the operation of the paper feed system 32 and paper pickoff mechanism 36, a clutch mechanism 52 for effecting alternate operation of the separator and feed rollers in the paper feed system, and a lever control system 54 for adjusting the length of scan, toner dispensing rate, and separator roller tension.

It is believed that the foregoing description is sufficient for the purpose of this application to show the general operation of a xerographic copier-duplicator. For further details concerning the specific construction of the xerographic copier-duplicator shown, reference is made to copending Mayo et al. application, Serial No. 824,500, filed July 2, 1959, now Patent No. 3,062,109.

*Paper Feed System*

Referring now to the specific subject matter of the invention, the sheet feeding mechanism 32, positioned in the image transfer station D, for seriatim feeding of cut-sheet transfer material into contact with the xerographic drum so that the developed powder images on the surface of said drum may be transferred to the transfer material, consists of a tray for holding a supply of cut-sheet transfer material, separator rollers for separating a single sheet of transfer material from said supply, feed rollers for feeding a single sheet into impression contact with the drum and means for coordinating the operation of the separator rollers and feed rollers to thereby feed a single sheet of transfer material into contact with the drum for proper registration of the powder image on the drum onto the transfer material.

Referring now specifically to FIGS. 4 to 12, inclusive, the apparatus for feeding sheets of transfer material to the xerographic drum 20 in timed relation to the appearance of a developed image thereon includes a pair of forwarding or feed rollers 401 and 402, usually made of rubber or similar material, mounted in cooperative relation to each other in front of guides 403 and 404 which direct sheets of transfer material forwarded by said feed rollers into contact with the drum 20 at a point at or slightly in advance of the corona transfer device 34.

Feed roller 401, which is a driven roller, is mounted in position by shaft SH10 journaled in frame plates 11 and 13 and is driven by pulley 405 secured to the end of shaft SH10. Feed roller 402, which is an idler roller, is mounted on shaft SH8 journaled at its ends in arms 406 pivotally mounted on frame plates 11 and 13, the feed roller 402 being yieldingly biased against the feed roller 401 by means of springs 407 so that feed roller 402 may be driven by frictional engagement with roller 401 or with a sheet of transfer material interposed between said rollers.

Referring now to the subject matter of the invention, a supply of cut-sheet transfer material 408, that is, typically sheets of paper or the like, to be fed one at a time to the feed rollers 401 and 402 is held in a paper tray 411 constructed in accordance with the invention.

In the preferred embodiment the paper tray 411 includes a base member 412 having angle plates 413 and 414 secured thereon as by welding, said angle plates being positioned with their upright legs parallel to the sides of the base member and with their lateral legs partially extending over the center channel of the base member to form a slot 415.

Sheets of transfer material are positioned both longitudinally and laterally on the tray by means of margin guides 416 and 417 adjustably mounted on the tray. Each of the margin guides 416 and 417, formed complementary to each other, is provided with an upright back leg at right angles to the side leg to guide the back edge of the material and a lateral extending leg adapted to rest on the top of said tray.

The margin guides are adjustably positioned on the tray by means of back guide 418 adapted to be selectively positioned along the length of said tray. Back guide 418 is centered in the tray by means of bar 421, adapted to ride in slot 415, secured in a suitable manner to the underside of the extension leg of the back guide. Leaf springs 422, interposed between bar 421 and a second bar 423 secured thereto, hold the back guide 418 in position on the tray while still permitting longitudinal adjustment of the guides. Since the back guide 418 is made of relatively thin sheet metal, a backing bar 424 is secured to the upright leg of back guide 418 so that the slots in the backing bar 424 are aligned with the slots in the back guide.

To permit lateral adjustment of the margin giudes 416 and 417, each of said margin guides is provided with a stud 425 secured thereto which projects through a slot in the back guide and backing bar to be engaged by a washer 426 and thumb nut 427 whereby each guide may be tightened against the back guide.

Each of margin guides is provided with a friction pad 428, usually made of rubber or other suitable material which will hold a stack of transfer material with sufficient force to prevent the entire stack from sliding when the top sheet is withdrawn, and for the same reason two pads 431, of similar material, are positioned at the right-hand end of the tray, as seen in FIG. 6.

To aid an operator to correctly position a stack of transfer material in the tray, the back guide 418 is provided at its opposite ends with two duplicate scales for lateral positioning of the stack while the angle plate 414 is provided with a scale for longitudinal positioning of the stack.

Right-hand bracket 432 and left-hand bracket 433, respectively connected to the frame plate 13 and base plate 10, are adapted to support the paper tray assembly by means of a pair of commercial type drawer slides. As shown in FIGS. 6 and 7, the female portions 434 of the slides are secured in a suitable manner to the brackets 432 and 433, and the complementary portions 435 are secured to the angle plates 413 and 414 with shims 436 interposed between the angle plate and the complementary portions 435 as required.

Figure 5:
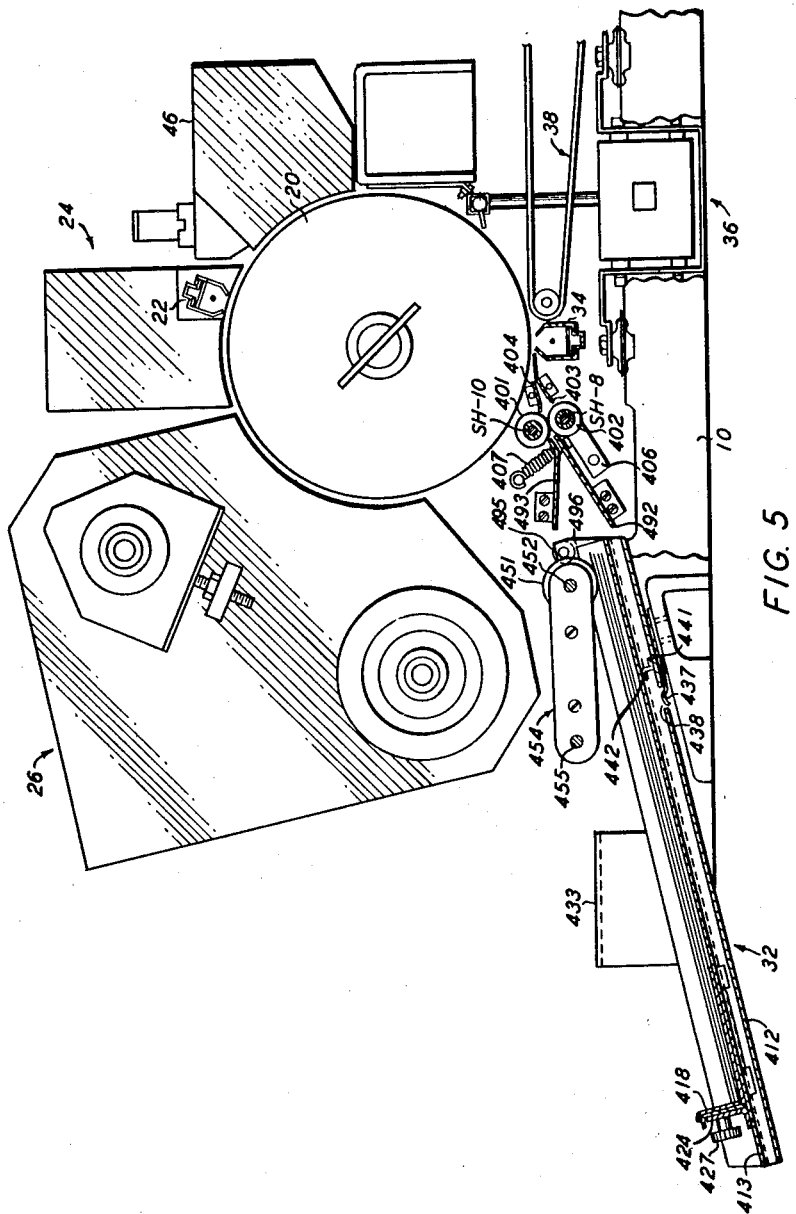
FIG. 5 is a side sectional view of the image transfer station of the xerographic apparatus and associated elements.

As shown in FIG. 5, the tray 411 is positioned for seriatim feeding of single sheets therefrom by means of a spring detent 437, secured to the inclined surface of base plate 10, which locks into the opening 438 formed in base member 412. Also mounted on the base plate 10 are a pair of bumpers 441 positioned to strike the depending stops 442 secured to the bottom side of base member 412. To prevent spring detent 437 from arresting the movement of the tray 411 as it is inserted into operating position, spring detent depressor 443 is struck up at the end of base member 412 to permit the tray to slide over detent 437.

To feed sheets of transfer material one at a time from the paper tray 411 into the bite of the feed rollers, there is provided a paper feeding and separating means comprising intermittently driven rollers 451 fixedly mounted upon shaft 452 journaled in bearings 453 mounted in arm 454 adapted to swing about the axis of shaft 455. As shown in FIG. 8, the arm 454 consists of arm shells 456 and 457 butted together and held in place by screws 458 extending through the arm shells to be threaded into spacers 459.

The means for driving the rollers 451 comprises pulley 461 secured to a conventional slip clutch 462, and pulley 463 mounted on shafts 452 and 455, respectively, and operatively connected together by means of timing belt 464.

The slip clutch 462 permits the rollers 451 to be rotated either by timing belt 464 or by frictional contact with a sheet of transfer material as it is pulled forward by feed rollers 401 and 402.

Shaft 455 which is journaled by bearing 465 in frame 13 and by bearing 466 in arm shell 456 is normally biased to the left as seen in FIG. 8, by means of spring 467 interposed between snap ring 468 on shaft 455 and shaft encircling washer 471 butted against frame 13. As shaft 455 is forced to the left, the notched end of said shaft is forced into the aperture in the end of shaft SH11 to engage drive pin 473 secured therein. As shown in FIG. 9, shaft SH11 which is journaled in bearings 464 positioned in frame 13 and sleeve 475 has an intermittently driven pulley 476 secured thereon. Washers 477 and 478 ride against a shoulder on shaft SH11 to prevent axial movement of said shaft to the left as seen in FIG. 9.

To adjust the pressure of rollers 451 on the stack of transfer material in paper tray 411, the arm 454 is fixed to one end of arm shaft 481, the opposite end of the arm shaft being notched to engage drive pins 482 secured to the counterboard end of sleeve 475 journaled in frame 11, the sleeve being retained against axial movement to the right as seen in FIGS. 8 and 9 by snap ring 483 secured in a suitable groove formed in the sleeve.

A spring tension sleeve 484, having gear 485 secured thereon by (pins) 479, is loosely mounted by a bearing 464 adjacent sleeve 475 on shaft SH11, and is axially aligned on the shaft by thrust bearing 486 abutting snap ring 487 positioned in a suitable groove on the shaft. Torque is applied by means of coil spring 488 secured at one end by spring pin 491 to sleeve 475 and at its opposite end to spring tension sleeve 484 by having the end of the spring forced into a suitable aperture in said spring tension sleeve. By rotating gear 485 by means of chain 489 operated in a suitable manner (not shown) by a control lever in lower control panel 7, roller pressure in the stack of paper in paper tray 411 can be adjusted by an operator to accommodate any weight paper used as a transfer material.

Figure 4:
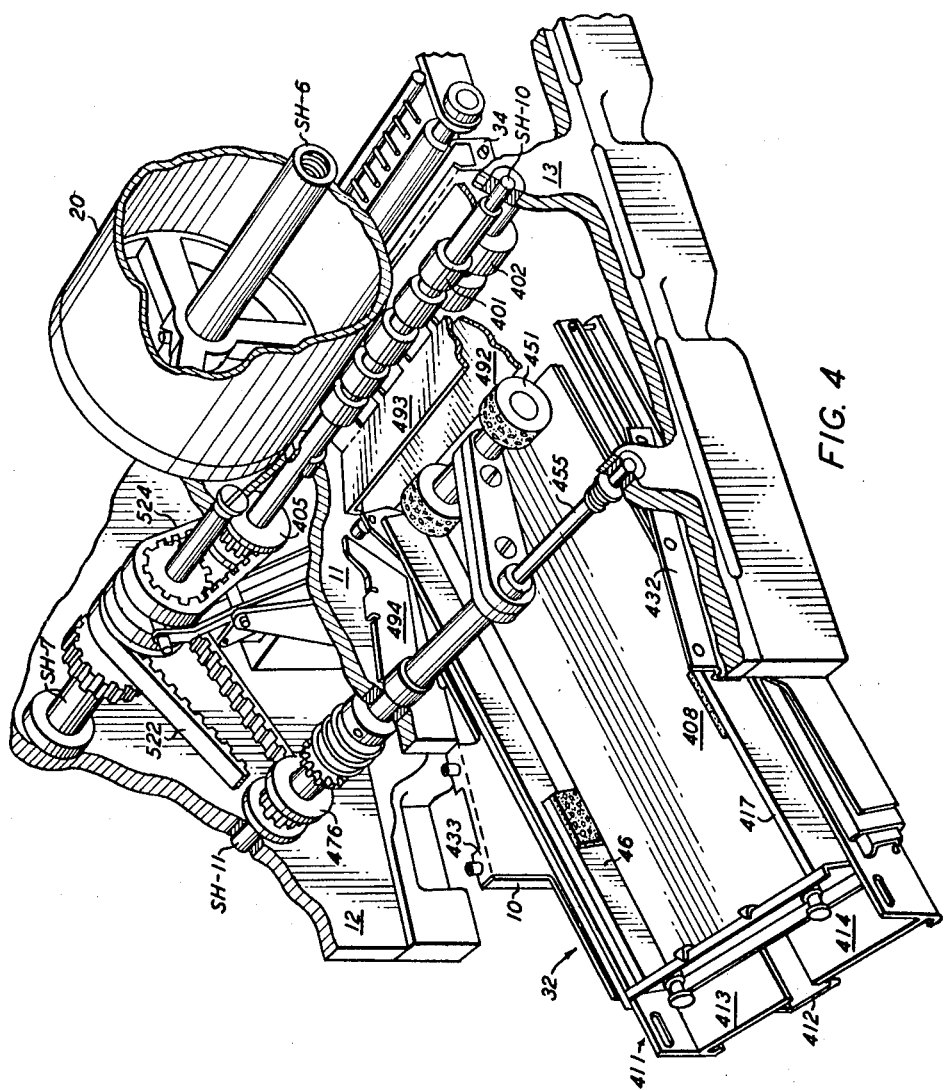
FIG. 4 is a right-hand perspective view, partly in section, of the paper feed mechanism of the apparatus.

Interposed between rollers 451 and feed rollers 401 and 402 there is provided, as shown in FIGS. 4 and 5, a pair of paper guides 492 and 493 supported at opposite ends by frames 11 and 13 to guide each sheet of transfer material forwarded by rollers 451 into the bite of rollers 401 and 402.

To permit the rollers 451 to clear a stack of transfer material in tray 411 as the tray is moved to its normal operating position as shown in FIG. 4 or when the tray is removed from its normal operating position, there is provided a cam arm 494 and cam followed 495 to pivot arm 454 to elevate the rollers 451.

As shown, cam arm 494, having a cam riser at one end thereof is secured at its opposite end, as by welding, to sleeve 475 connected by means of arm shaft 481 and arm pins 482 to the arm 454, whereby movement of the cam arm 494 effects an equal movement of arm 454. To effect movement of cam arm 494 as the tray 411 is moved into or out of its normal operating position, the cam follower 495 is secured to a cam follower support 496 fixed to the vertical leg of angle plate 413 of tray 411.

*Clutch Mechanism*

Both the operation of the paper separator rolls 451 and the paper feed roll 401 is effected by clutch mechanism 52 having separate clutch drives, the selection of the drives being controlled by means of a solenoid-operated clutch shifter actuated by the programmer 50 of the type disclosed in copending Eichler et al. application, Serial No. 824,657 filed July 2, 1959, now Patent No. 3,090,616.

Figure 10:
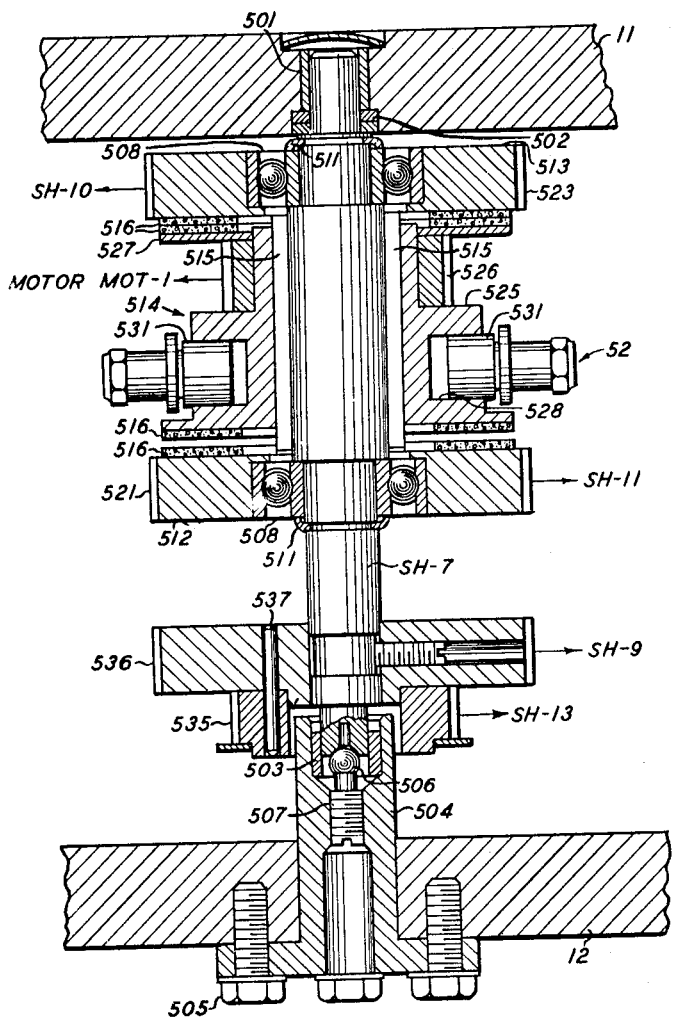
FIG. 10 is a sectional view of the clutch mechanism of the paper feed system.

As illustrated in FIGS. 10, 11, and 12, clutch mechanism 52, which is supported and housed by the frame plates 11 and 12, includes a horizontal driven shaft SH7 that rotates at one end in bearing 501 mounted in frame 11, the shoulder of the shaft at this end riding against thrust washers 502 also mounted in frame 11.

At its opposite end the shaft SH7 is journaled in bearing 503 mounted in flanged bearing bracket 504 which extends through frame 12 and is secured thereto by bolts 505. Axial alignment and end thrust of the shaft is controlled by means of thrust ball 506 engaged in the socket formed in the end of shaft SH7 and in the socket of screw 507 threaded into bearing bracket 504.

The inner races of bearings 508 mounted on shaft SH7 against bearing locating shoulders formed on the shaft are secured in position by bearing retainers 511 located in suitable grooves in the shaft adjacent the bearings. The outer races of the bearings 508 support complementary clutch elements 512 and 513 which are free to rotate relative to the shaft. A third clutch element 514, adapted to coact with complementary clutch elements 512 and 513, is fitted on shaft SH7 in interposed relation to clutch elements 512 and 513 and is free for relative movement with respect to the axis of the shaft SH7, but is connected to the shaft for rotation therewith by means of keys 515. All three clutch elements are of the annular plate type, but element 514 differs from the others in that it presents two oppositely facing frictional pads 516 respectively in opposed relation to the inwardly facing frictional pads 516 of clutch elements 512 and 513.

The frictional surfaces of clutch element 514 are spaced from the opposed surfaces of clutch elements 512 and 513 to permit axial movement of clutch element 514 whereby it may be selectively engaged with either clutch element 512 or clutch element 513.

Clutch element 512 is provided with peripheral teeth 521 and is in effect a drive pulley wheel adapted to be connected, as shown in FIG. 4, by timing belt 522 to driven pulley 476 mounted on shaft SH11 to drive the paper separator rolls. In a similar manner, clutch element 513 is provided with peripheral teeth 523 and is in effect a drive pulley wheel adapted to be connected by timing belt 524 to driven pulley 405 mounted on shaft SH10 to drive the paper feed roll 401.

Clutch element 514 includes a hub 525 fixedly supporting ring pulley 526 and annular plate 527 staked onto its reduced portion, the friction elements of the clutch element being secured to flanged end of hub 525 and annular plate 527, respectively. The hub 525 is provided with an annular groove adapted to receive the rollers 531 of the yoke mechanism described hereinafter whereby the clutch element 514 may selectively be moved into or out of engagement with either of the clutch elements 512 and 513. The ring pulley 526 is adapted to be connected by a timing belt, not shown, to a pulley mounted on the main drive motor MOT1 whereby the shaft SH7 is continually rotated while the machine is in operation.

Secured as by set screws to the left-hand end of the shaft SH7 are a pair of pulleys 535 and 536 connected together by pins 537, pulley 535 being adapted to be connected by a belt to drive the toner dispenser 28 and pulley 536 being adapted to be connected by a belt to drive the conveyor of the developer apparatus 26.

The clutch shifter mechanism for shifting clutch element 514 with respect to clutch elements 512 and 513 includes a shifter bracket 543 mounted on base plate 10. A forked double crank lever 545 which consists of two Y levers 546 and 547 held in spaced parallel relation to each other by spacer sleeve 548 and by the rod 551 is rotatably mounted on spindle 552 positioned in the upright legs of shifter bracket 543, the spindle 552 being retained in position by snap rings 553 inserted in suitable grooves at opposite ends of the spindle. As shown, spacer sleeve 548 encircles spindle 522.

Rollers 531 adapted to ride in the groove 528 in clutch element 514 are rotatably secured to the inner faces of the Y levers 546 and 547 at the forked end of the double crank lever 545 by means of roller bolts 554 inserted in the rollers, passing through the Y levers to engage lock nuts 556. The normally open solenoid SOL-1 connected to a suitable electric circuit is mounted by means of solenoid bracket 557 to frame 12. The plunger of the solenoid SOL-1 is notched to receive clevis 558 pivotally secured to the plunger by clevis pin 559.

Spacer sleeve 548 is provided with a longitudinal slot to receive the bent end of actuator spring 561 which extends over and under split pins 562 in the crank lever to be secured by retainer pin 563 in the forked end of clevis 558, whereby the rollers on the crank lever may be forced to the left in FIG. 10 to shift clutch element 514 into engagement with clutch element 512 when the solenoid 501 is energized.

Normally clutch element 514 is forced into driving relationship with clutch element 513 by means of the rollers which are normally biased to the right by tension spring 565 connected at one end to the upright leg of shifter bracket 543 and at its other end engaging rod 551. The tension of spring 565 should be great enough to supply the required pressure between coacting clutch elements 514 and 513 while still permitting solenoid SOL-1 to overcome the force of the spring to bring clutch element 514 into operational relationship with clutch element 512.

Referring now back to the operation of the separator rollers 451 and the feed rollers 401 and 402, when the paper separator rollers 451 are driven by the clutch element 512, the clutch element 513 for driving roller 401 is disengaged from the power source by disengagement from clutch element 514 when solenoid SOL-1 is energized. As the rollers 451 are driven they forward a sheet of transfer material into the bite of rollers 401 and 402 where its forward motion is momentarily stopped. As the movement of a sheet of transfer material under rollers 451 continues after the leading edge of the sheet has been stopped by rollers 401 and 402, the sheet is buckled as the rollers continue to rotate. The rotation of rollers 451 is continued just sufficiently to bow the paper whereby the resiliency of the paper forces the leading edge of the sheet into transverse alignment with the rollers 401 and 402, irrespective of its original alignment thereto, so that the paper is forwarded by said rollers in correct alignment with the drum as roller 401 is activated when solenoid SOL-1 is de-energized, permitting clutch element 514 to engage clutch element 513 through the biasing action of spring 565.

The paper tray constructed in accordance with the invention insures correct alignment of the stack of paper because the margin guides used to align the side edges of the stack are secured directly to the back guides whereby they are always positioned at right angles to the back guide and therefore parallel to each other to grip the side edges of the stack uniformly. With this arrangement it is a simple matter to correctly align the stack of paper on the tray with the leading edge of the bottom sheet of the stack in frictional contact with the friction pads at the front of the tray and to maintain this alignment as the tray is moved from a loading position to its operative position whereat the stack of paper is in position for seriatim feeding of the sheets from the tray.

While the invention has been described with reference to a preferred embodiment of the paper feed tray disclosed herein, it is not confined to the details set forth since many modifications and changes will become apparent to those skilled in the paper feeding art. This application is intended to cover such modifications or changes as may come within the purposes of the improvements or the scope of the following claims.

What is claimed is:

1. A paper supply tray including
   a base member having a depressed channel portion extending longitudinally thereof,
   plate means secured to said base member with a portion of said plate means partially extending over said depressed channel portion to form a slot,
   a back guide member having an extension leg portion overlying said slot and adapted to slide on said plate means and an upright leg portion extending laterally across said plate means,
   centering and friction means connected to the underside of said extension leg portion and extending through said slot into said depressed channel portion to adjustably position said back guide member on said plate means,
   a pair of margin guides formed complementary to each other adjustably mounted on said back guide member on opposite sides of said slot,
   each of said margin guides including an upstanding rear leg adjustably secured to said back guide,
   an upstanding side leg extending at right angles to said back guide to align the side margins of a stack,
   and a paper support leg extending inwardly toward said slot, said paper support leg being adapted to slide on said plate means, said paper support legs of said margin guides and said extension leg portion of said back guide member being adapted to support the rear and rear side portion of a stack of paper;

a pressure pad secured to the upstanding side leg of each of said margin guides to yieldingly guide to the side margin of a stack paper on said plate means and said paper support legs, and friction pads secured to said base means at the front thereof and on opposite sides of said slot to yieldingly hold a stack of paper on said base means.

2. In a reproducing apparatus having a reproducing mechanism supported by a frame, a supply tray for a stack of sheet material, said supply tray including a base member having a depressed channel portion extending longitudinally thereof, plate means secured to said base member with portions of said plate means extending from opposite sides over said depressed channel portion to form a slot, a back guide member having an extension leg portion overlying said slot and adapted to slide on said plate means and an upright leg portion extending laterally across said plate means, centering and friction means connected to the underside of said extension leg portion and extending through said slot into said depressed channel portion to adjustably position said back guide member on said plate means, a pair of margin guides adjustably positioned on said back guide member on opposite sides of said slot, each of said margin guides including an upstanding rear leg adjustably secured to said back guide member, an upstanding side leg extending at right angles to said back guide member to align the side margins of a stack, and a paper support leg extending inwardly toward said slot, said paper support leg being adapted to slide on said plate means, said paper support legs of said margin guides and said extension leg of said back guide member being adapted to support a portion of a stack of paper;

a pressure pad secured to each of said upstanding side legs of each of said margin guides to yieldingly guide the side margins of a stack of sheets, and slide means connected to said plate means, said slide means being adapted to cooperate with mating slide means secured to said frame of said reproducing apparatus whereby said supply tray is movably supported by said frame.

References Cited in the file of this patent

UNITED STATES PATENTS

| | | |
|---|---|---|
| 1,295,773 | Lesher | Feb. 25, 1919 |
| 1,964,498 | Brasseur | June 26, 1934 |
| 2,112,341 | Klemm | Mar. 29, 1938 |
| 2,262,781 | Shipp | Nov. 18, 1941 |
| 2,626,149 | Holmberg | Jan. 20, 1953 |
| 2,652,249 | Bruns | Sept. 15, 1953 |
| 2,797,638 | Miller | July 2, 1957 |